United States Patent [19]

Copes

[11] Patent Number: 4,838,378
[45] Date of Patent: Jun. 13, 1989

[54] STRAP COVER

[76] Inventor: Rene J. Copes, 203 Church St., Chesaning, Mich. 48616

[21] Appl. No.: 148,046

[22] Filed: Jan. 25, 1988

[51] Int. Cl.$^4$ ............................................. B60R 21/00
[52] U.S. Cl. ..................................... 280/808; 297/482
[58] Field of Search ................ 280/801, 808; 297/482, 297/483; 24/576, 578, 587

[56] References Cited

U.S. PATENT DOCUMENTS 3,751,327  8/1973  Hausler .................................. 24/578
3,957,282  5/1976  Finnigan .............................. 297/482

FOREIGN PATENT DOCUMENTS 3445822   9/1986  Fed. Rep. of Germany ...... 297/482
1176188   4/1959  France ................................... 24/576
1313692  11/1962  France ................................... 24/576
2436608   4/1980  France ................................. 297/482

Primary Examiner—Charles A. Marmor
Assistant Examiner—Ross Weaver
Attorney, Agent, or Firm—Learman & McCulloch

[57] ABSTRACT

A cover for a vehicle lap or torso belt comprises a body formed of cushioning material having a cavity therein for the accommodation of a length of the belt. The cavity is accessible through an opening formed in one side of the cover and such opening comprises a plurality of interlocking dovetail segments which may be separated from one another.

9 Claims, 1 Drawing Sheet

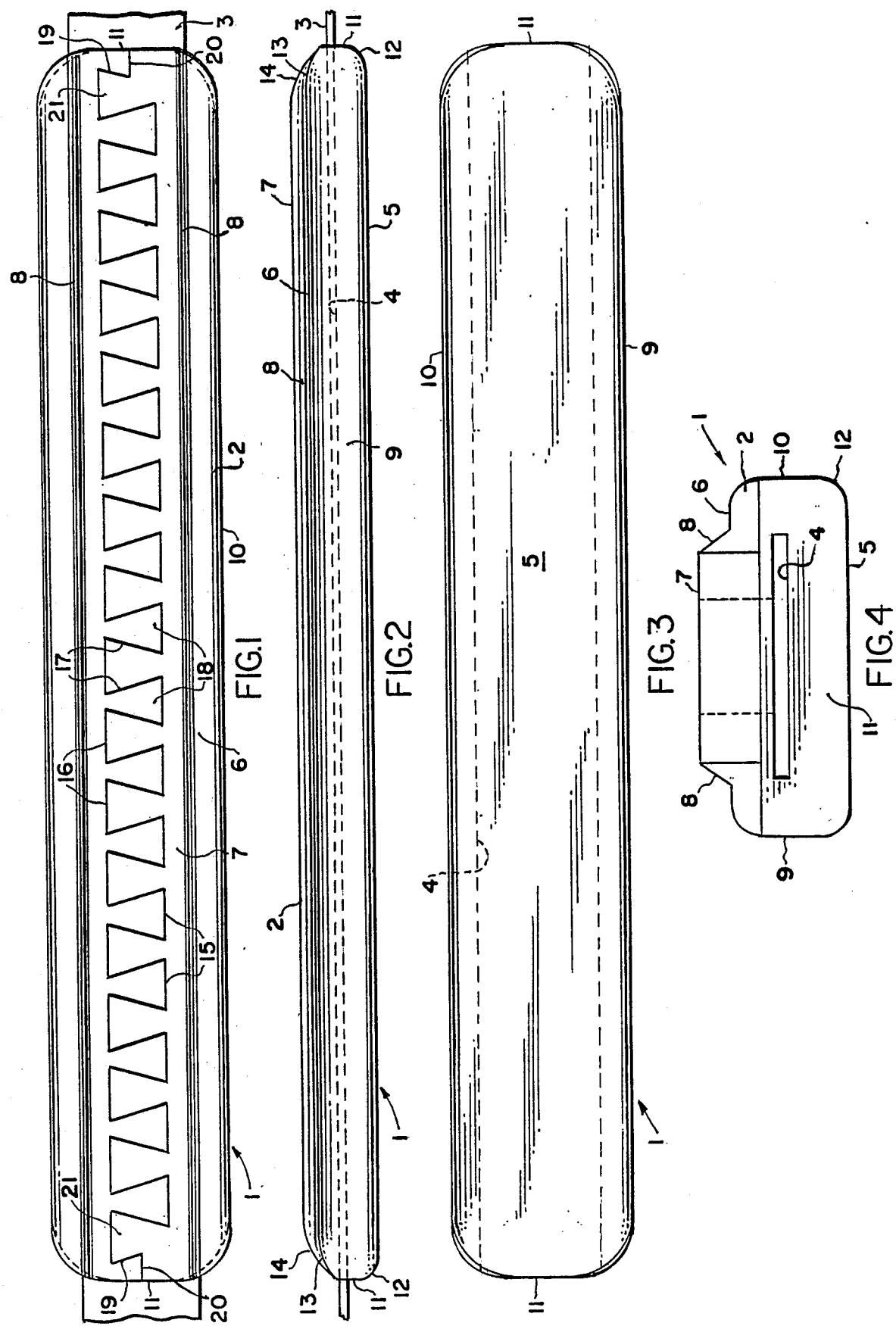

ic
STRAP COVER

This invention relates to a protective cover that is removably attachable to a strap such as an automotive seat or torso belt.

BACKGROUND OF THE INVENTION

Vehicles currently are equipped with passenger restraining devices such as belts which extend across the lap and torso of an occupant. In many instances the material from which the strap is made is sufficiently rough to irritate the occupant's skin or adversely affect his or her clothing. In addition, when a vehicle equipped with such straps is involved in a collision, the occupant using such strap may be injured by the edges of the straps, or by the force with which the strap acts on the occupant to restrain his or her movement due to sudden deceleration of the vehicle, or both.

Strap covers of the general class to which the invention relates have been proposed heretofore but have not been particularly successful for a variety of reasons, among which are the tendency of the covers to slide along the strap that it covers, the ease with which such covers may be separated from their straps by acts of mischief or theft, and the resistance of such covers to conform to the contours of a user's body.

A strap cover constructed in accordance with the invention overcomes the objections referred to above.

SUMMARY OF THE INVENTION

A strap cover constructed in accordance with the preferred embodiment of the invention comprises an elongate body formed of resilient, deformable, rubbery material within which is a cavity for the accommodation of a length of strap forming a vehicle lap or torso restraining belt. One side of the cover has a longitudinally extending ridge which is composed of a plurality of interlocking dovetail segments that may be separated to permit the strap to be accommodated in the cavity. The deformability of the material from which the cover is made, together with the separable dovetail segments, enables the cover to conform closely and easily to the contours of a person's body, in a comfortable manner, but without impairing in any way the cushioning capability of the cover.

DRAWINGS

A preferred embodiment of the invention is disclosed in the following description and the accompanying drawings, wherein:

FIG. 1 is a top plan view of a cover applied to a length of strap;

FIG. 2 is a side elevational view;

FIG. 3 is a bottom plan view but with the strap reemoved; and

FIG. 4 is an end elevational view with the strap removed.

THE PREFERRED EMBODIMENT

A cover constructed in accordance with the preferred embodiment of the invention is designated by the reference character 1 and comprises an elongate body 2 formed of a resilient, deformable, rubbery cushioning material such as polyurethane foam and is of such length as to accommodate a selected length of an automotive lap or torso belt 3. Extending longitudinally of and completely through the body 2 is a cavity 4 having a width and height of such dimensions as to enable the cavity snugly to accommodate the strap, but permit the body to be slid longitudinally of the strap when desired.

The cover 1 has one relatively broad side 5 the surface of which is flat and smooth. The opposite side 6 has an upstanding ridge 7 having side edges 8 which converge upwardly in a direction away from the body. The cover has opposite sides 9 and 10 which are perpendicular to the side 5 and the junctures of the sides 9 and 10 with the surfaces 5 and 6 are smoothly rounded.

At each end of the cover is an end wall 11 that is perpendicular to the side 5 and is joined to the latter by a smoothly curved surface 12. The side 6, as well as the upper surface of the ridge 8, is joined to the ends 11 along smoothly curved, tapered surfaces 13 and 14, respectively, which are so shaped as to minimize the thickness of the cover at its opposite ends.

The ridge 7 is provided with two series of transversely spaced, longitudially extending slits 15 and 16 connected by transversely extending slits 17 which form interlocking dovetail segments 18. The segments 18 are of substantially uniform length and width, and the length of each segment is less than the width of the cavity 4.

The endmost transverse slits 19 are only about half the length of the slits 17 and each is joined to a longitudinal slit 20 which is at the center of the ridge 7 and extends to the adjacent end of the cover. Thus, at each end of the cover is a dovetail segment 21 which is about one-half the width and length of the segments 18.

Access to the cavity 4 may be obtained through the ridge 7 by squeezing the cover about its longitudinal axis in such manner as to cause the sides 9 and 10 to approach one another with the surface 5 creased concavely, thereby enabling the interlocked dovetail segments 18 to separate from one another to form an access opening and enable the strap 3 to be placed in the cavity 4. This type of operation may be made repeatedly at longitudinally spaced intervals so as to enable the entire cavity to be occupied by the strap.

When applying the cover to a strap, the cover should be placed on the strap in such manner that the smooth surface 5 confronts the body of the user. The dovetail segments thus will face in a direction away from the user's body. Since a strap and cover used by a person will result in the cover's being curved, the positioning of the dovetail segment in the manner specified above will make it possible for the cover to assume the requisite curvature more easily than if the dovetail segments directly confronted the body of the user.

The multiplicity of dovetail segments enables only those areas of the cover which require bending to do so without subjecting the whole cover to the distortion that would result if the dovetail segments were not present.

The smoothness of the external surfaces of the cover provide protection against irritation of a person's skin and prevent damage to the person's clothing. However, the material from which the cover is made provides cushioning for the person's body in the event of a collision or other sudden deceleration of the vehicle.

Although it is not difficult to apply or remove the cover to a strap, the presence of the multiple dovetail segments requires more time to do so than would be the case if the cover simply were slit longitudinally. Consequently, the risk of loss of the cover as the result of a michievous impulse or theft is lessened.

The disclosed embodiment is representative of a presently preferred form of the invention, but is intended to be illustrative rather than definitive thereof. The invention is defined in the claims.

I claim:

1. A cover for a length of strap such as an automotive seat or torso belt comprising an elongate body having a length corresponding to a selected length of said strap, said body being formed of resilient, rubbery, deformable material and having a cavity extending longitudinally therethrough for the accommodation of said length of strap, and an access opening formed in said body in communication with said cavity and extending the full length of said body at one side thereof, said opening comprising a series of interlocking dovetail segments, the endmost dovetail segment at each end of said body being substantially one-half the width and length of the remaining dovetail segments.

2. A cover for a length of strap such as an automotive seat or torso belt comprising an elongate body having a length corresponding to a selected length of said strap, said body being formed of a resilient, rubbery, deformable material and having a cavity extending longitudinally therethrough for the accommodation of said length of strap, and an access opening formed in said body in communication with said cavity and extending the full length of said body at one side thereof, said opening comprising a series of separable, interlocking, dovetail segments, said cavity being accessible through said opening by bending said body to form a concave crease in that side of said body opposite said one side, thereby enabling said segments to disengage and separate from one another.

3. A cover according to claim 2 wherein said body tapers at its opposite ends.

4. A cover according to claim 2 wherein each of said segments has a length less than the width of said cavity.

5. A cover according to claim 2 wherein at said one side of said body is an upstanding ridge extending substantially the full length of said body, said opening extending through said ridge.

6. A cover according to claim 2 wherein said ridge has side walls which converge in a direction away from said body.

7. A cover according to claim 2 wherein said opposite side of said body has a smooth, unbroken surface.

8. A cover according to claim 2 wherein at each end of said body the endmost dovetail segment is substantially one-half the width and length of the remaining dovetail segments.

9. A cover according to claim 2 wherein said one side of said body has an exposed surface that is flush on opposite sides of said opening.

* * * * *